United States Patent
Takagi et al.

(10) Patent No.: US 6,697,726 B2
(45) Date of Patent: Feb. 24, 2004

(54) ROLLING CONTROL APPARATUS AND METHOD OF VEHICLE

(75) Inventors: Masashi Takagi, Susono (JP); Masami Aga, Susono (JP); Tatsuaki Yokoyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 162 days.

(21) Appl. No.: 09/956,988

(22) Filed: Sep. 21, 2001

(65) Prior Publication Data

US 2002/0059023 A1 May 16, 2002

(30) Foreign Application Priority Data

Oct. 5, 2000 (JP) ........................................ 2000-306074

(51) Int. Cl.[7] .......................... G06F 19/00; G06G 7/00; B60G 23/00; B62K 25/00
(52) U.S. Cl. ............................ 701/70; 701/37; 701/38; 701/39; 701/48; 701/72; 701/76; 701/91; 280/5.501; 280/5.502; 280/5.506; 280/5.51
(58) Field of Search ................. 701/70, 37, 38, 701/39, 48, 91, 72, 76; 280/5.501, 5.502, 5.506, 5.51

(56) References Cited

U.S. PATENT DOCUMENTS

| | | | | |
|---|---|---|---|---|
| 5,251,134 A | * | 10/1993 | Takehara et al. ............. 701/38 |
| 5,869,943 A | * | 2/1999 | Nakashima et al. ......... 318/586 |
| 6,081,761 A | * | 6/2000 | Harada et al. ................ 701/72 |
| 6,139,120 A | * | 10/2000 | Fukada ........................ 303/146 |
| 6,178,368 B1 | * | 1/2001 | Otake .......................... 701/70 |
| 6,272,420 B1 | * | 8/2001 | Schramm et al. ............. 701/72 |
| 6,321,141 B1 | * | 11/2001 | Leimbach ..................... 701/1 |
| 6,349,247 B1 | | 2/2002 | Schramm et al. |
| 6,384,719 B1 | * | 5/2002 | Dieckmann .................. 340/440 |
| 6,438,464 B1 | | 8/2002 | Woywod et al. |
| 6,496,758 B2 | * | 12/2002 | Rhode et al. ................... 701/1 |
| 6,498,976 B1 | * | 12/2002 | Ehlbeck et al. ............... 701/70 |
| 6,502,023 B1 | * | 12/2002 | Fukada ........................ 701/38 |

FOREIGN PATENT DOCUMENTS

| | | | |
|---|---|---|---|
| DE | 198 02 041 A1 | 7/1999 | |
| DE | 199 07 633 A1 | 10/1999 | |
| DE | 198 56 303 A1 | 1/2000 | |
| JP | A 02-193749 | 7/1990 | |
| JP | 5-50823 A | * 3/1993 | ......... B60G/17/015 |
| JP | A 07-117654 | 5/1995 | |
| JP | A 08-048226 | 2/1996 | |
| JP | 10-81215 A | 3/1998 | |
| JP | A 2000-033866 | 2/2000 | |
| JP | A 2000-052963 | 2/2000 | |
| JP | A 2000-159079 | 6/2000 | |

* cited by examiner

*Primary Examiner*—William A. Cuchlinski, Jr.
*Assistant Examiner*—Brian J Broadhead
(74) *Attorney, Agent, or Firm*—Oliff & Berridge, PLC

(57) ABSTRACT

A rolling control apparatus and method for controlling rolling of a vehicle controls braking force applied to at least one wheel of the vehicle. The apparatus and method set a target roll angle of the vehicle based on a rolling state of the vehicle, calculate a total control quantity for achieving the target roll angle, based on a running condition of the vehicle, and control the braking force applied to each wheel of the vehicle, based on the total control quantity.

24 Claims, 3 Drawing Sheets

ROLLING CONTROL APPARATUS AND METHOD OF VEHICLE

INCORPORATION BY REFERENCE

The disclosure of Japanese Patent Application No. 2000-306074 filed on Oct. 5, 2000, including the specification, drawings and abstract, is incorporated herein by reference in its entirety.

BACKGROUND OF THE INVENTION

1. Field of the Invention

The invention relates generally to rolling control apparatus and method of a motor vehicle, such as an automobile, and more particularly to rolling control apparatus and method that control rolling of the vehicle by controlling braking force applied to a wheel or wheels of the vehicle.

2. Description of Related Art

A known example of rolling control apparatus of a vehicle, such as an automobile, is disclosed in, for example, Japanese Laid-open Patent Publication No. 10-81215. The known rolling control apparatus is constructed such that braking force is applied to a wheel or wheels on the outside of a turn if a parameter representing a rolling state of the vehicle exceeds a threshold value set for the purpose of preventing an excessively large degree of rolling.

In the rolling control apparatus as described above, if the parameter representing the rolling state of the vehicle exceeds the threshold value, the braking force is automatically applied to the wheels on the outside of the turn, so that the vehicle is decelerated with the radius of the turn of the vehicle being increased. As a result, the centrifugal force applied to the vehicle is reduced, and the vehicle is prevented from being brought into an excessive rolling state.

In the known rolling control apparatus as described above, the braking force is merely applied to the wheels on the outside of the turn when the parameter representing the rolling state of the vehicle exceeds the threshold value, but the roll angle of the vehicle is not controlled to a predetermined or desired angle. Accordingly, the roll angle of the vehicle may differ or vary depending upon the running conditions of the vehicle even when rolling control, i.e., vehicle stability control to suppress rolling, is performed. Thus, the known rolling control apparatus is not able to optimally control the rolling state of the vehicle regardless of the running conditions of the vehicle.

SUMMARY OF THE INVENTION

It is therefore an object of the invention to provide a rolling control apparatus that sets a target roll angle of the vehicle to be used in rolling control (i.e., vehicle stability control to suppress rolling), and controls braking force applied to each wheel so that the roll angle of the vehicle becomes equal to the target roll angle, whereby the rolling state of the vehicle is optimally controlled irrespective of the running conditions of the vehicle. It is another object of the invention to provide such a rolling control method.

To accomplish the above and/or other object(s), the invention provides rolling control apparatus and method for controlling rolling of a vehicle by controlling braking force applied to at least one wheel of the vehicle. A controller of the rolling control apparatus sets a target roll angle of the vehicle based on a rolling state of the vehicle, calculates a total control quantity for achieving the target roll angle, based on a running condition of the vehicle, and controls the braking force applied to each of the at least one wheel of the vehicle, based on the total control quantity.

In the rolling control apparatus constructed according to the invention as described above, the target roll angle of the vehicle is set based on a rolling state of the vehicle, and the total control quantity for achieving the target roll angle is calculated based on the running conditions of the vehicle, so that the braking force applied to each wheel of the vehicle is controlled based on the total control quantity. Accordingly, the roll angle of the vehicle is controlled to the target roll angle regardless of the running conditions of the vehicle, and therefore the rolling state of the vehicle can be optimally controlled regardless of the running conditions of the vehicle.

In a first preferred embodiment of the invention, the controller calculates a first target yaw moment for achieving the target roll angle by feed-forward control, based on the running condition of the vehicle, and calculates the total control quantity based on at least the first target yaw moment. In this case, the roll angle of the vehicle is efficiently controlled to the target roll angle, as compared with the case where the total control quantity is derived only from a control quantity for achieving the target roll angle through feedback control, for example.

In a second preferred embodiment of the invention, the controller calculates the total control quantity, based on a first control quantity for achieving the target roll angle by feed-forward control, and a second control quantity for achieving the target roll angle by feedback control. Here, the first control quantity is calculated based on the running condition(s) of the vehicle, and the second control quantity is calculated based on a deviation of an actual roll angle of the vehicle from the target roll angle. With this arrangement, the roll angle of the vehicle can be more appropriately controlled to the target roll angle, as compared with the case where the total control quantity is derived only from the first control quantity or the second control quantity.

In the second preferred embodiment of the invention, the first control quantity may be a first target yaw moment while the second control quantity may be a second target yaw moment, and the controller may calculate a final target yaw moment as the total control quantity, based on at least the first target yaw moment and the second target yaw moment. With this arrangement, the roll angle of the vehicle is more appropriately controlled to the target roll angle, as compared with the case where the final target yaw moment is derived only from the first target yaw moment or the second target yaw moment, i.e., as compared with the case where either the first target yaw moment or the second target yaw moment is defined as the final target yaw moment as the total control quantity.

In general, three equations of motion (1), (2) and (3) as indicated below are established in view of the balances among the forces in the rolling direction, yawing direction and the lateral direction of the vehicle.

$$M(Vxd + \theta y dVx) - MH\theta rdd = \\ -\frac{Kf + Kr}{Vx}Vy - \frac{LfKf - LrKr}{Vx}\theta yd + Kf\delta f + Kr\delta r \quad (1)$$

$$Iy\theta ydd - Iyr\theta rdd = \\ -\frac{LfKf - LrKr}{Vx}Vy - \frac{Lf^2 Kf - Lr^2 Kr}{Vx}\theta yd + LfKf\delta f - LrKr + N \quad (2)$$

$$(Ir + MH^2)\,\theta rdd - Iyr\,\theta ydd - MH(Vxd + \theta rdVx) = -C\text{roll}\,\theta rd - K\text{roll}\,\theta r \quad (3)$$

In the above equations (1), (2) and (3), θy, θyd, θydd represent yaw angle, yaw velocity (yaw rate), and yaw acceleration of the vehicle, respectively, θr, θrd, θrdd represent roll angle, roll rate (roll velocity), and roll acceleration of the vehicle, respectively, Vx, Vy represent longitudinal velocity and lateral velocity of the vehicle, respectively, and Vxd represents longitudinal acceleration of the vehicle. Furthermore, "N" is yaw moment of the vehicle, "M" is sprung mass, "H" is vertical distance between the axis of rolling of the vehicle and the gravity of the load on the spring, "g" is gravitational acceleration (acceleration of free fall), "Ir" and "Iy" are roll moment of inertia and yaw moment of inertia on the spring, respectively, and "Iyr" is product of inertia on the spring with respect to the axis of rolling and the axis of yawing. "Kf" and "Kr" are cornering powers of tires of front wheels and rear wheels, respectively, and "Croll" and "Kroll" are damping coefficient and spring constant of a suspension as measured in the rolling direction, "Lf" and "Lr" are distance between the gravity of the load on the spring and the axis of the front wheels as measured in the longitudinal direction (i.e., running direction) of the vehicle and distance between the gravity of the load on the spring and the axis of the rear wheels as measured in the same direction, and "δf" and "δr" are steering angles of the front wheels and the rear wheels, respectively.

In each of the above-indicated equations (1), (2) and (3), it is assumed that the unsprung mass is zero, the axis of rolling extends in the horizontal direction, and the roll angle of the vehicle is very small. On these assumptions, the position of the gravity of the load on the spring and the moment of inertia during rolling of the vehicle is substantially the same as those during non-rolling, and the sprung mass acts uniformly on the left and right wheels.

If "Nt" represents target yaw moment for making the roll angle θr of the vehicle equal to a predetermined target roll angle θrt during a normal turn of the vehicle, the target yaw moment Nt is obtained by substituting θrt for θr and substituting Nt for N in the above equations (1), (2) and (3), as expressed in the following equation (4).

$$Nt = \left\{ -\frac{Kroll(LfKf - LrKr)}{H(Kf + Kr)} + \frac{KrollKfKr(Lf + Lr)^2}{MH(Kf + Kr)Vx^2} \right\} \theta rt - \frac{KfKr(Lf + Lr)}{Kf + Kr}(\delta f - \delta r) \quad (4)$$

It will be understood from the above equation (4) that once the longitudinal velocity Vx of the vehicle, the steering angle δf of the front wheels, and the steering angle δr of the rear wheels are known, the target yaw moment Nt for controlling the roll angle θr to the target roll angle θrt can be calculated through feed-forward control. In the case where the rear wheels of the vehicle do not receive steering forces, the steering angle δr of the rear wheels is set to zero.

In the first preferred embodiment of the invention as described above, the controller may calculate the first target yaw moment according to the above-indicated equation (4).

In the second preferred embodiment of the invention as described above, the controller may calculate the first control quantity according to the above-indicated equation (4).

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENT(S)

Figure 1:
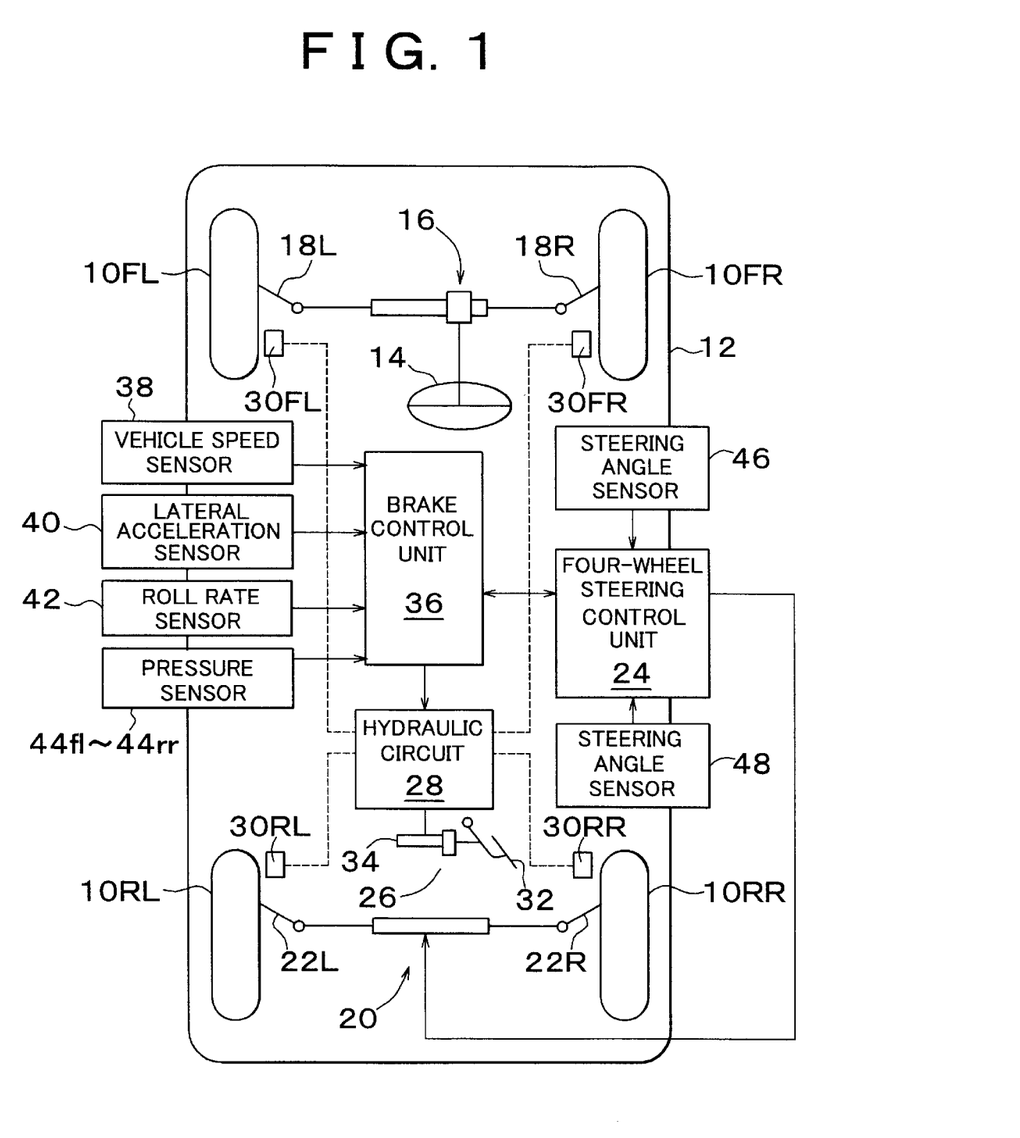
FIG. 1 is a schematic diagram illustrating a rolling control apparatus according to a preferred embodiment of the invention, which apparatus is employed in a vehicle in which a four-wheel steering apparatus is installed.

FIG. 1 is a schematic diagram illustrating a rolling, control apparatus according to a preferred embodiment of the invention, which apparatus is employed in a vehicle 12 in which a four-wheel steering apparatus is installed.

Referring to FIG. 1, the vehicle, 12 has right and left front wheels 10FR, 10FL and right and left rear wheels 10RR, 10RL. The right and left front wheels 10FR, 10FL receive steering forces from a rack-and-pinion type power steering device 16 for front wheels, via respective tie rods 18R, 18L. The front-wheel power steering device 16 is driven in response to a turn of a steering wheel 14 caused by a vehicle operator or driver. Thus, the steering angle δf of the right and left front wheels 10R, 10L is controlled in response to a steering operation of the vehicle operator.

On the other hand, the right and left rear wheels 10RR, 10RL receive steering forces from a rack-and-pinion type power steering device 20 for rear wheels, via respective tie rods 22R. 22L. The steering angle δr of the right and left rear wheels 10RR, 10RL is controlled by a four-wheel steering control unit 24, based on the steering angle of and the vehicle speed V, in the manner known in the art.

A brake system 26 includes a hydraulic circuit 28, wheel cylinders 30FR, 30FL, 30RR, 30RL, a brake pedal 32, and a master cylinder 34. The hydraulic circuit 28 of the brake system 26 is operable to control braking pressures applied to the wheel cylinders 30FR, 30FL, 30RR, 30RL, so as to control braking forces that act on the respective wheels 10FR, 10FL, 10RR, 10RL. Although not shown in FIG. 1, the hydraulic circuit 22 includes an oil reservoir, an oil pump, various valve devices, and so forth. In normal operations, the braking pressure applied to each wheel cylinder is controlled by the master cylinder 34 that is driven in accordance with driver's operations to depress the brake pedal 32. The braking pressure applied to each wheel cylinder is also controlled as needed by a brake control unit 36, as described later in detail.

The brake control unit 36 receives a signal indicative of the vehicle speed (longitudinal velocity of the vehicle) Vx detected by a vehicle speed sensor 38, a signal indicative of the lateral acceleration Gy of the vehicle detected by a lateral acceleration sensor 40, a signal indicative of the roll rate θrd of the vehicle detected by a roll rate sensor 42, and signals indicative of braking pressures Pbi (i=fr, fl, rr, rl) of right and left front wheels and right and left rear wheels detected by pressure sensors 44FR, 44FL, 44RR, 44RL, respectively. The brake control unit 36 also receives, via the four-wheel steering control unit 24, signals, indicative of the steering angle δf of the front wheels and the steering angle δr of the rear wheels which are respectively detected by the steering angle sensors 46 and 48. In the present embodiment, the roll rate sensor 24 and the steering angle sensors 46, 48 detect the roll rate θrd and the steering angles δf, δr, respectively, with the direction of a left turn of the vehicle being defined as the positive direction.

Although not illustrated in detail in the drawings, each of the four-wheel steering control unit 24 and the brake control unit 36 has a generally structured microcomputer that includes, for example, a CPU, a ROM, a RAM, and input and output port devices, which are interconnected by a bidirectional common bus.

Figure 2:
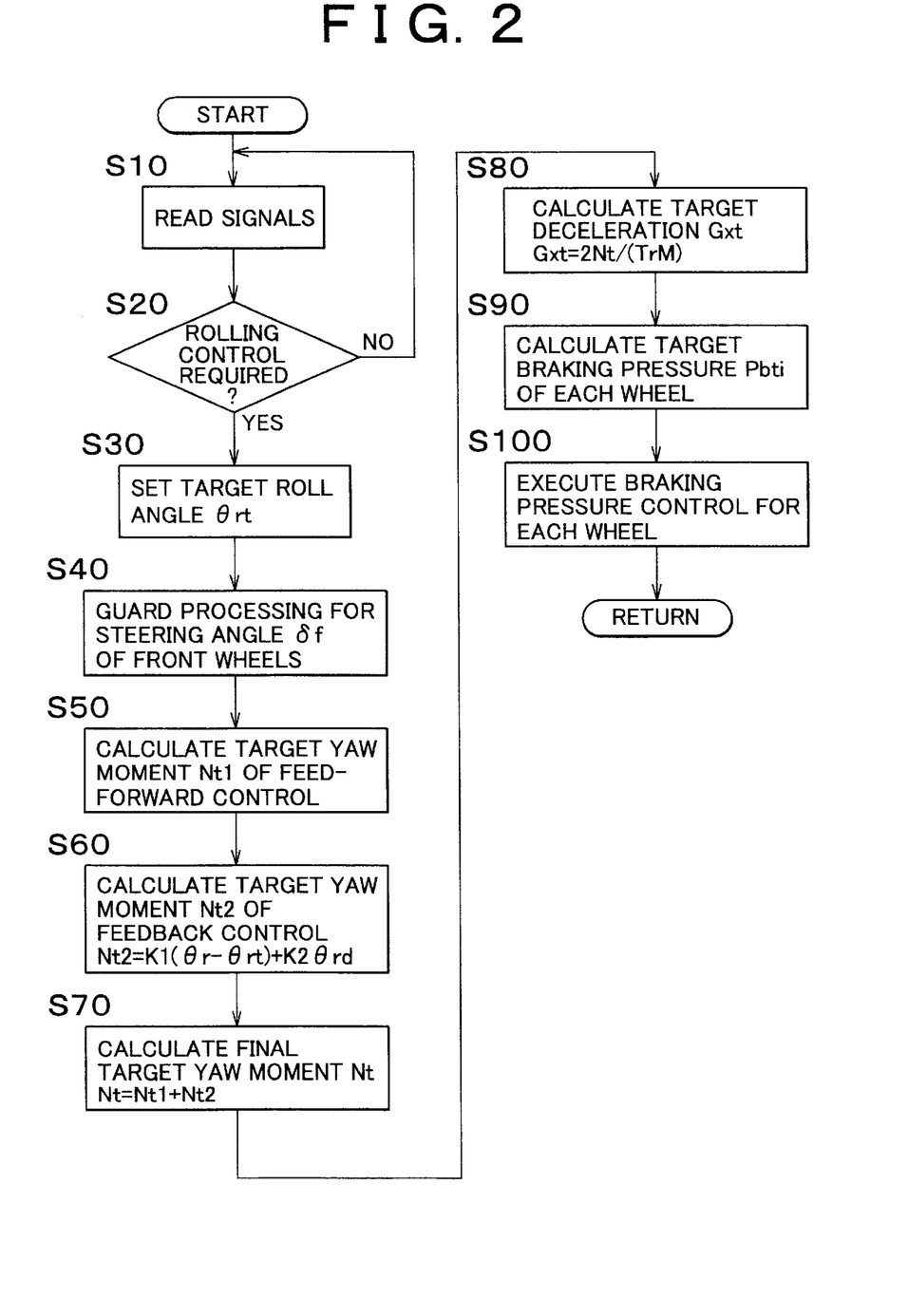
FIG. 2 is a flowchart illustrating a rolling control routine executed by the rolling control apparatus of FIG. 1.

The brake control unit 36 is adapted to perform control operations in accordance with the flowchart as illustrated in FIG. 2. More specifically, the brake control unit 36 determines whether rolling control, i.e., vehicle stability control to suppress rolling, needs to be performed, as described later. If the rolling control is required or desired, the brake control unit 36 sets a target roll angle θrt based on the direction of rolling of the vehicle, and calculates a target yaw moment Nt1 of feed-forward control and a target yaw moment Nt2 of feed-back control so that the roll angle Or of the vehicle becomes equal to the target roll angle θrt.

The brake control unit 36 then calculates a final target yaw moment Nt (total control quantity) as a sum of the target yaw moment Nt1 of feed-forward control and the target yaw moment Nt2 of feed-back control, and calculates a target deceleration Gxt based on the final target yaw moment Nt. The brake control unit 36 then calculates a target braking pressure Pbti (i=fl, fr, rl; rr) of each wheel based on the target deceleration Gxt, and controls the braking pressure Pbi of each wheel to be equal to a corresponding target braking pressure Pbti. In this manner, the roll angle θr of the vehicle is controlled to the target roll angle θrt in a situation where the roll angle of the vehicle is likely to be excessively large.

Furthermore, in the present embodiment, the brake control unit 36 determines a turning behavior of the vehicle, based on parameters detected by various sensors. If the vehicle undergoes a spin or a drift-out during a turn, the brake control unit 36 calculates a target braking amount of a vehicle wheel or wheels (which will be called "wheel(s) to be controlled") to which braking force is to be applied so as to stabilize the turning behavior, while using, for example, a speed of a front wheel on the inside of the turn as a reference wheel speed. The control unit 36 then controls the braking force of the wheel(s) to be controlled, so that the braking amount of the wheel(s) in question becomes equal to the target braking amount. As a result, a yaw moment is applied to the vehicle in a direction to suppress the spin or drift-out, and at the same time the vehicle is decelerated and its behavior is stabilized. It is to be understood that the vehicle stability control thus effected by controlling the braking force is not essential to the invention, and therefore will not be described herein in detail. The vehicle stability control may be carried out in any manner known in the art, or may be omitted.

Referring next to the flowchart shown in FIG. 2, the rolling control according to the present embodiment will be described. Control according to the flowchart of FIG. 2 is started upon turn-on of an ignition switch that is not illustrated in FIG. 1, and is repeatedly executed at predetermined intervals.

Initially, step S10 is executed to read signals including a signal indicative of the vehicle speed Vx detected by the vehicle sensor 32. In step S20, the brake control unit 36 determines whether an absolute value of the lateral acceleration Gy of the vehicle is equal to or larger than a reference value Gyo (positive constant) so as to determine whether there is a high possibility that the roll angle of the vehicle becomes excessively large, and whether the rolling control is required or desired. If a negative decision (NO) is obtained in step S20, control returns to step S10. If an affirmative decision (YES) is obtained in step S20, step S30 is then executed.

In step S30; it is determined whether the roll direction of the vehicle is the right direction, namely, whether the vehicle rolls clockwise, based on the sign (positive or negative) of the lateral acceleration Gy of the vehicle. If the vehicle rolls clockwise, the target roll angle θrt is set to θrto (which is a positive constant). If the vehicle rolls counterclockwise, the target roll angle θrt is set to—θrto.

Figure 3:
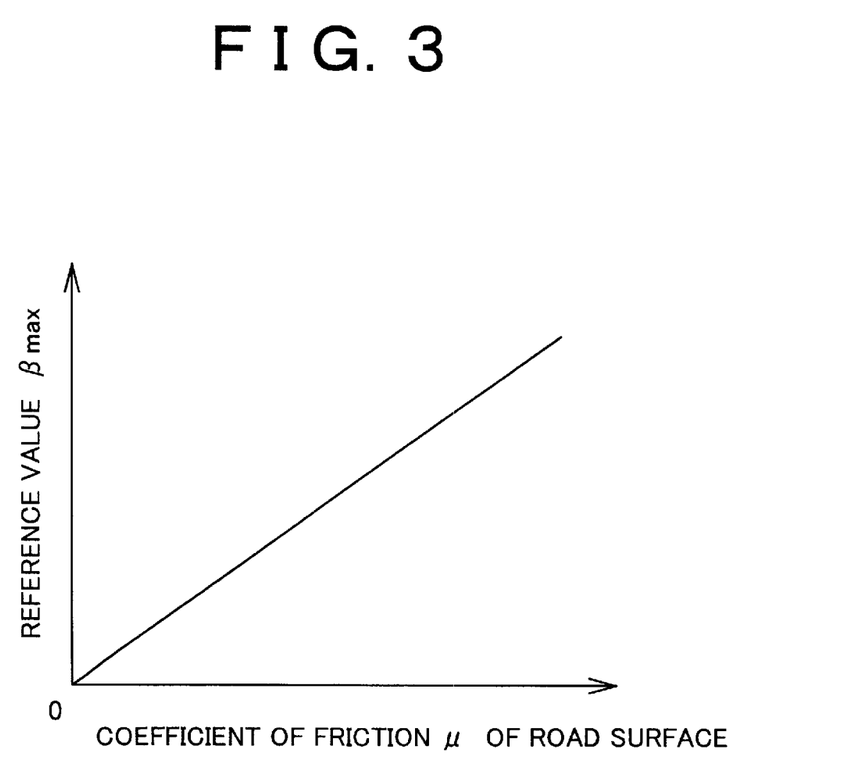
FIG. 3 is a graph indicating the relationship between a reference value of a front-wheel slip angle and a coefficient of friction of a road surface.

In step S40, a coefficient of friction $\mu$ of the road surface and a slip angle βf of the front wheels are calculated in the manners known in the art, and a reference value βmax associated with the slip angle βf of the front wheels is calculated from a map corresponding to the graph shown in FIG. 3, based on the coefficient of friction $\mu$ of the road surface. If the absolute value of the front-wheel slip angle βf is equal to or smaller than the reference value βmax, the steering angle δf of the front wheels after guard processing is calculated according to equation (5) as indicated below. If the absolute value of the front-wheel slip angle βf is greater than the reference value βmax, the steering angle δf of the front wheels after guard processing is calculated according to equation (6) as indicated below. Thus, the guard processing is performed with respect to the steering angle δf of the front wheels.

$$\delta f\text{(after guard processing)}=\delta f\text{(detected value)}+\beta f-\beta max \quad (5)$$

$$\delta f\text{(after guard processing)}=\delta f\text{(detected value)}+\beta f+\beta max \quad (6)$$

The guard processing as mentioned above is performed so that the lateral force generated by the right and left front wheels is controlled within friction circles of these wheels. In other words, the guard processing is intended for preventing an excessively large target yaw moment Nt1 of feed-forward control, which cannot be actually generated by the wheels, from being calculated in step 50 (which will be described later) due to an otherwise possible large absolute value of the steering angle δf of the front wheels. On the other hand, no guard processing is performed with respect to the steering angle or of the rear wheels, since in general the rear-wheel steering angle δr does not become so large as to require guard processing.

In step S50, a target yaw moment Nt1 of feed-forward control for controlling the roll angle θr to the target roll angle θrt is calculated according to the above-indicated equation (4), based on the vehicle speed Vx, the front-wheel steering angle δf that has been subjected to the above guard processing, the rear-wheel steering angle δr, and the target roll angle θrt.

In step S60, a roll angle θr of the vehicle is calculated through integration based on the roll rate θrd of the vehicle detected by the roll rate sensor 42, and a target yaw moment Nt2 of feed-back control for controlling the roll angle θr to the target roll angle θrt is calculated according to the following equation (7) where K1 and K2 are positive constant coefficients.

$$Nt2=K1(\theta r-\theta rt)+K2\theta rd \quad (7)$$

It will be understood from the above equation (7) that coefficient K1 is a feedback gain associated with a deviation of the roll angle θr of the vehicle from the target roll angle θrt, and coefficient K2 is a feedback gain associated with the roll velocity or roll rate (i.e., a deviation of the roll velocity θrd of the vehicle from the target roll velocity θrdt which is zero). For example, the coefficients K1, K2 are empirically set to the optimum values depending upon the vehicle to which the invention is applied.

In step S70, the final target yaw moment is calculated as a sum of the target yaw moment Nt1 of feed-forward control and the target yaw moment Nt2 of feed-back control, according to the following equation (8).

$$Nt = Nt1 + Nt2 \quad (8)$$

In step S80, a target deceleration Gxt of the vehicle is calculated according to the equation (9) as indicated below, where Tr represents tread. The target deceleration Gxt is to be achieved by applying braking force to the wheels on the outside of the turn so that a yaw moment corresponding to the final target yaw moment Nt is applied to the vehicle.

$$Gxt = 2Nt/(TrM) \quad (9)$$

In step S90, a target braking torque Tbti (i=fl, fr, rl, rr) of each wheel that makes the deceleration of the vehicle equal to the target deceleration Gxt while keeping the yaw moment of the vehicle substantially equal to the final target yaw moment Nt is calculated in a manner known in the art (for example, in a manner as disclosed in Japanese laid-open Patent Publication No. 11-348753). In this step, a target braking pressure Pbti of each wheel is also calculated based on the target braking torque. In step S100, the braking pressure Pbi of each wheel is controlled in a feed-back manner so that the braking pressure Pbi becomes equal to the corresponding target braking pressure Pbti. After executing step S100, control returns to step S10.

In the present embodiment as described above, it is determined in step S20 whether there is high possibility that the roll angle of the vehicle becomes excessively large and the rolling control is required or desired to be performed, based on the magnitude of the lateral acceleration Gy of the vehicle. If the rolling control is required or desired, a target roll angle $\theta rt$ is set based on the rolling direction of the vehicle in step S30.

In step S50, the target yaw moment Nt1 of feed-forward control for controlling the roll angle $\theta r$ to the target roll angle $\theta rt$ is calculated based on the vehicle speed Vx, the front-wheel steering angle of after the guard processing, the rear-wheel steering angle $\delta r$, and the target roll angle $\theta rt$. In step S60, the target yaw moment Nt2 of feed-back control for controlling the roll angle $\theta r$ to the target roll angle $\theta rt$ is calculated. In step S70, the final target yaw moment Nt is calculated as a sum of the target yaw moment Nt1 of feed-forward control and the target yaw moment Nt2 of feed-back control.

In step S80, a target deceleration Gxt to be achieved by applying braking force to the wheels on the outside of the turn so that a yaw moment corresponding to the final target yaw moment Nt is applied to the vehicle is calculated. In step S90, a target braking torque Tbti of each wheel that makes the deceleration of the vehicle equal to the target deceleration Gxt while keeping the yaw moment of the vehicle substantially equal to the final target yaw moment Nt is calculated, and a target braking pressure Pbti of each wheel is also calculated based on the target braking torque. In step S100, the braking pressure Pbi of each wheel is controlled in a feed-back manner so that the braking pressure Pbi becomes equal to the corresponding target braking pressure Pbti. As a result, the vehicle is decelerated at a rate corresponding to the target deceleration Gxt, so that a yaw moment corresponding to the final target yaw moment Nt is applied or given to the vehicle, and the roll angle $\theta r$ of the vehicle is controlled to the target roll angle $\theta rt$.

According to the illustrated embodiment as described above, the final target yaw moment Nt as a total control quantity for making the roll angle $\theta r$ equal to the target roll angle $\theta rt$ is calculated when there is a high possibility that the roll angle of the vehicle becomes excessively large, and the target deceleration Gxt corresponding to the final target yaw moment Nt is calculated. Since the vehicle is decelerated so as to achieve the target deceleration Gxt, the roll angle $\theta r$ of the vehicle can be controlled to the target roll angle $\theta rt$ regardless of the running conditions of the vehicle, such as the vehicle speed and the steering angles of the front and rear wheels.

In the illustrated embodiment, not only the braking forces applied to the wheels on the outside of the turn but also the deceleration of the vehicle is controlled so that a yaw moment corresponding to the final target yaw moment Nt is applied to the vehicle. Namely, the target deceleration Gxt corresponding to the final target yaw moment Nt is calculated, and the braking force of each wheel is controlled so that the vehicle is decelerated at a rate corresponding to the target deceleration Gxt. Accordingly, the roll angle $\theta r$ can be controlled to the target roll angle $\theta rt$ without excessively increasing the radius of turn of the vehicle, thus assuring an improved ability of the vehicle to follow or trace the intended course, as compared with the case where only the braking forces applied to the wheels on the outside of the turn are controlled so that a yaw moment corresponding to the final target yaw moment Nt is applied to the vehicle.

In the illustrated embodiment, the final target yaw moment Nt is calculated as a sum of the target yaw moment Nt1 for controlling the roll angle $\theta r$ of the vehicle to the target roll angle $\theta rt$ under feed-forward control and the target yaw moment Nt2 for controlling the roll angle $\theta r$ to the target roll angle $\theta rt$ under feed-back control. Accordingly, the roll angle $\theta r$ of the vehicle can be controlled to the target roll angle $\theta rt$ with improved reliability as compared with the case where the final target yaw moment Nt is derived only from the target yaw moment Nt1 of feed-forward control. Furthermore, the roll angle $\theta r$ of the vehicle can be controlled to the target roll angle $\theta rt$ with improved efficiency as compared with the case where the final target yaw moment Nt is derived only from the target yaw moment Nt2 of feed-back control.

Moreover, in the illustrated embodiment, the target yaw moment Nt2 of feedback control is calculated as a linear sum of a feedback control quantity based on a deviation of the roll angle $\theta r$ of the vehicle from the target roll angle $\theta rt$, and a feedback control quantity based on the roll velocity or roll rate $\theta rd$. Accordingly, the roll angle $\theta r$ can be more appropriately controlled to the target roll angle $\theta rt$ as compared with the case where the target yaw moment Nt2 of feedback control is calculated based on only one of the above feedback control quantities.

While the preferred embodiment of the invention has been described above, for illustrative purpose only, it would be apparent to those skilled in the art that the invention is not limited to details of the illustrated embodiment, but may be embodied with various changes, modifications, or improvements, without departing from the spirit and scope of the invention.

In the illustrated embodiment, the target deceleration Gxt is calculated based on the final target yaw moment Nt, and the target braking pressure Pbti of each wheel is calculated based on the target deceleration Gxt. The invention, however, is not limited to this manner of calculating the target braking pressure Pbti. For example, the target braking pressure Pbti of each wheel may be calculated based on the final target yaw moment Nt, as a braking pressure that causes a yaw moment corresponding to the final target yaw moment Nt to be applied to the vehicle. Alternatively, the target braking pressure Pbi of each wheel may be calculated based on the final target yaw moment Nt and the target deceleration Gxt that is calculated based on the final target yaw moment Nt.

In the illustrated embodiment, the target yaw moment Nt2 of feedback control is calculated as a linear sum of a feedback control quantity based on a deviation of the roll angle θr of the vehicle from the target roll angle θrt, and a feedback control quantity based on the roll velocity θrd. The invention, however, is not limited to this manner of calculating the target yaw moment Nt2 of feedback control. For example, a target yaw rate θydt and a target lateral velocity Vy of the vehicle that make the roll angle θr of the vehicle equal to the target roll angle θrt may be calculated in a similar manner as in the case of the target yaw moment Nt, according to the equations (1) to (3) as indicated above, and a target yaw moment Nt2 of feedback control may be calculated according to the following equation (10) in which coefficients K3 and K4 represent feedback gains associated with a deviation of the actual yaw rate from the target yaw rate and a deviation of the actual lateral velocity from the target lateral velocity. In this case, rolling of the vehicle can be further favorably controlled as compared with the illustrated embodiment.

$$Nt2=K1(\theta r-\theta rt)+K2\theta rd+K3(\theta yd-\theta ydt)+K4(Vy-Vyt) \quad (10)$$

While the determination as to whether the rolling control is required or desired is made based on the magnitude of the lateral acceleration Gy of the vehicle that is detected by the lateral acceleration sensor, this determination may be made based on the magnitude of the lateral acceleration or the yaw rate of the vehicle that is estimated based on the vehicle speed Vx and the steering angles δf, δr.

While the roll angle θr of the vehicle is obtained by integrating the roll rate θrd that is detected by the roll rate sensor 42, the roll angle θr may be detected by a roll angle sensor, or may be estimated based on a result of detection by a vehicle height sensor, and the like. In this case, the roll rate θrd is calculated by differentiating the roll angle θr.

While the roll angle θr of the vehicle is obtained by integrating the roll rate θrd that is detected by the roll rate sensor 42, the roll angle θr and the roll rate θrd of the vehicle may be estimated based on the lateral acceleration Gy of the vehicle.

While the rolling control apparatus of the illustrated embodiment is incorporated in the vehicle having the four-wheel steering apparatus that enables the rear wheels as well as the front wheels to receive steering forces from respective power steering devices, the invention is also applicable to vehicles in which only front wheels receive steering forces from a power steering device. In this case, the steering angle δr of the rear wheels in the above-indicated equations is set to zero.

What is claimed is:

1. A rolling control apparatus for controlling rolling of a vehicle by controlling braking force applied to at least one wheel of the vehicle, comprising a controller that:

sets a target roll angle of the vehicle based on a rolling state of the vehicle;

calculates a total control quantity for achieving the target roll angle, based on a running condition of the vehicle; and controls the braking force applied to each of the at least one wheel of the vehicle, based on the total control quantity, wherein the controller calculates a first target yaw moment for achieving the target roll angle by feed-forward control, based on the running condition of the vehicle, and calculates the total control quantity based on at least the first target yaw moment.

2. The rolling control apparatus according to claim 1, wherein the controller calculates the first target yaw moment based on at least one of a steering angle of front wheels, a steering angle of rear wheels, a vehicle speed and the target roll angle.

3. A rolling control apparatus for controlling rolling of a vehicle by controlling braking force applied to at least one wheel of the vehicle, comprising a controller that:

sets a target roll angle of the vehicle based on a rolling state of the vehicle;

calculates a total control quantity for achieving the target roll angle, based on a running condition of the vehicle; and controls the braking force applied to each of the at least one wheel of the vehicle, based on the total control quantity, wherein the controller calculates the total control quantity, based on a first control quantity for achieving the target roll angle by feed-forward control, and a second control quantity for achieving the target roll angle by feedback control, the first control quantity being calculated based on the running condition of the vehicle, the second control quantity being calculated based on a deviation of an actual roll angle of the vehicle from the target roll angle, and wherein the controller calculates the first control quantity, based on a target roll angle and at least one of a steering angle of front wheels, a steering angle of rear wheels, and a vehicle speed.

4. A rolling control apparatus for controlling rolling of a vehicle by controlling braking force applied to at least one wheel of the vehicle, comprising a controller that:

sets a target roll angle of the vehicle based on a rolling state of the vehicle;

calculates a total control quantity for achieving the target roll angle, based on a running condition of the vehicle; and controls the braking force applied to each of the at least one wheel of the vehicle, based on the total control quantity, wherein the controller calculates the total control quantity, based on a first control quantity for achieving the target roll angle by feed-forward control, and a second control quantity for achieving the target roll angle by feedback control, the first control quantity being calculated based on the running condition of the vehicle, the second control quantity being calculated based on a deviation of an actual roll angle of the vehicle from the target roll angle, and wherein the controller calculates the second control quantity, based on a first control-quantity component based on a deviation of an actual roll angle of the vehicle from the target roll angle, and a second control-quantity component based on an actual roll velocity of the vehicle.

5. The rolling control apparatus according to claim 4, wherein the second control quantity is calculated as a linear sum of the first control-quantity component and the second control-quantity component.

6. A rolling control apparatus for controlling rolling of a vehicle by controlling braking force applied to at least one wheel of the vehicle, comprising a controller that:

sets a target roll angle of the vehicle based on a rolling state of the vehicle;

calculates a total control quantity for achieving the target roll angle, based on a running condition of the vehicle; and controls the braking force applied to each of the at least one wheel of the vehicle, based on the total control quantity, wherein the controller calculates the total control quantity, based on a first control quantity for achieving the target roll angle by feed-forward control, and a second control quantity for achieving the target roll angle by feedback control, the first control quantity being calculated based on the running condition of the vehicle, the second control quantity being calculated based on a deviation of an actual roll angle of the vehicle from the target roll angle, wherein the first control quantity comprises a first target yaw moment, and the second control quantity comprises a second target yaw moment, and wherein the controller calculates a final target yaw moment as the total control quantity, based on at least the first target yaw moment and the second target yaw moment.

7. The rolling control apparatus according to claim 6, wherein the controller calculates the final target yaw moment as a sum of the first target yaw moment and the second target yaw moment.

8. The rolling control apparatus according to claim 6, wherein the controller calculates the second target yaw moment, based on a first yaw-moment component based on a deviation of an actual roll angle of the vehicle from the target roll angle, and a second yaw-moment component based on an actual roll velocity of the vehicle.

9. The rolling control apparatus according to claim 8, wherein the second yaw moment is calculated as a linear sum of the first yaw-moment component and the second yaw-moment component.

10. The rolling control apparatus according to claim 6, wherein the controller calculates a target braking amount of each of the at least one wheel for applying a yaw moment corresponding to the final target yaw moment to the vehicle, and controls a braking force applied to said each of the at least one wheel, based on the target braking amount.

11. The rolling control apparatus according to claim 6, wherein the controller calculates a target deceleration of the vehicle that corresponds to the final target yaw moment, calculates a target braking amount of each of the at least one wheel for achieving the target deceleration, and controls a braking force applied to said each of the at least one wheel, based on the target braking amount.

12. The rolling control apparatus according to claim 6, wherein the controller calculates a target deceleration of the vehicle that corresponds to the final target yaw moment, calculates a target braking amount of each of the at least one wheel based on the final target yaw moment and the target deceleration, and controls a braking force applied to said each of the at least one wheel, based on the target braking amount.

13. A method of controlling rolling of a vehicle by controlling braking force applied to at least one wheel of the vehicle, comprising the steps of:
setting a target roll angle of the vehicle based on a rolling state of the vehicle;
calculating a total control quantity for achieving the target roll angle, based on a running condition of the vehicle; and
controlling the braking force applied to each of the at least one wheel of the vehicle, based on the total control quantity, wherein a first target yaw moment for achieving the target roll angle by feed-forward control is calculated based on the running condition of the vehicle, and the total control quantity is calculated based on at least the first target yaw moment.

14. The method according to claim 13, wherein the first target yaw moment is calculated based on at least one of a steering angle of front wheels, a steering angle of rear wheels, a vehicle speed and the target roll angle.

15. A method of controlling rolling of a vehicle by controlling braking force applied to at least one wheel of the vehicle, comprising the steps of:
setting a target roll angle of the vehicle based on a rolling state of the vehicle;
calculating a total control quantity for achieving the target roll angle, based on a running condition of the vehicle; and
controlling the braking force applied to each of the at least one wheel of the vehicle, based on the total control quantity, wherein the total control quantity is calculated based on a first control quantity for achieving the target roll angle by feed-forward control, and a second control quantity for achieving the target roll angle by feedback control, the first control quantity being calculated based on the running condition of the vehicle, the second control quantity being calculated based on a deviation of an actual roll angle of the vehicle from the target roll angle, and wherein the first control quantity is calculated based on a target roll angle and at least one of a steering angle of front wheels, a steering angle of rear wheels, and a vehicle speed.

16. A method of controlling rolling of a vehicle by controlling braking force applied to at least one wheel of the vehicle, comprising the steps of:
setting a target roll angle of the vehicle based on a rolling state of the vehicle;
calculating a total control quantity for achieving the target roll angle, based on a running condition of the vehicle; and
controlling the braking force applied to each of the at least one wheel of the vehicle, based on the total control quantity, wherein the total control quantity is calculated based on a first control quantity for achieving the target roll angle by feed-forward control, and a second control quantity for achieving the target roll angle by feedback control, the first control quantity being calculated based on the running condition of the vehicle, the second control quantity being calculated based on a deviation of an actual roll angle of the vehicle from the target roll angle, and wherein the second control quantity is calculated based on a first control-quantity component based on a deviation of an actual roll angle of the vehicle from the target roll angle, and a second control-quantity component based on an actual roll velocity of the vehicle.

17. The method according to claim 16, wherein the second control quantity is calculated as a linear sum of the first control-quantity component and the second control-quantity component.

18. A method of controlling rolling of a vehicle by controlling braking force applied to at least one wheel of the vehicle, comprising the steps of:
setting a target roll angle of the vehicle based on a rolling state of the vehicle; calculating a total control quantity for achieving the target roll angle, based on a running condition of the vehicle; and
controlling the braking force applied to each of the at least one wheel of the vehicle, based on the total control quantity, wherein the total control quantity is calculated based on a first control quantity for achieving the target roll angle by feed-forward control, and a second control quantity for achieving the target roll angle by feedback control, the first control quantity being calculated based on the running condition of the vehicle, the second control quantity being calculated based on a deviation of an actual roll angle of the vehicle from the target roll angle, wherein the first control quantity comprises a first target yaw moment, and the second control quantity comprises a second target yaw moment, and wherein the controller calculates a final target yaw moment as the total control quantity, based on at least the first target yaw moment and the second target yaw moment.

19. The method according to claim 18, wherein the final target yaw moment is calculated as a sum of the first target yaw moment and the second target yaw moment.

20. The method according to claim 18, wherein the second target yaw moment is calculated based on a first yaw-moment component based on a deviation of an actual roll angle of the vehicle from the target roll angle, and a second yaw-moment component based on an actual roll velocity of the vehicle.

21. The method according to claim 20, wherein the second yaw moment is calculated as a linear sum of the first yaw-moment component and the second yaw-moment component.

22. The method according to claim 18, wherein a target braking amount of each of the at least one wheel for applying a yaw moment corresponding to the final target yaw moment to the vehicle is calculated, and a braking force applied to said each wheel is controlled based on the target braking amount.

23. The method according to claim 18, wherein a target deceleration of the vehicle that corresponds to the final target yaw moment is calculated, and a target braking amount of each of the at least one wheel for achieving the target deceleration is calculated, and wherein a braking force applied to said each wheel is controlled based on the target braking amount.

24. The method according to claim 18, wherein a target deceleration of the vehicle that corresponds to the final target yaw moment is calculated, and a target braking amount of each of the at least one wheel is calculated based on the final target yaw moment and the target deceleration, and wherein a braking force applied to said each wheel is controlled based on the target braking amount.

* * * * *